Patented Apr. 26, 1932

1,855,659

UNITED STATES PATENT OFFICE

LEONARD KAY WRIGHT, OF JACKSON HEIGHTS, NEW YORK

REFRIGERANT

No Drawing.   Application filed October 4, 1927. Serial No. 224,029.

This invention relates to a refrigeration process and more particularly has reference to a refrigerant for use in such a process.

Numerous substances have heretofore been employed as refrigerants, but their use has been attended by certain disadvantages. Some of the refrigerants have proved to be unstable under working conditions and have broken down into their component parts over a period of operation. Others have required, in the case of an adsorption refrigerating process, expensive adsorbents that are difficult to obtain. Still other substances employed as refrigerants have a marked affinity for water or air, such as sulphur dioxide, and this property has resulted in an inefficiency of operation inasmuch as the refrigerant unites with the water or air to form compounds that are injurious to the apparatus.

To overcome the disadvantages of the refrigerants heretofore used is one of the objects of this invention.

Another object is to devise a method of refrigeration that is simple and inexpensive.

A further object is to provide a refrigerant having a high refrigerating efficiency and one that is stable under working conditions.

And yet another object is to provide a refrigerant, economical to produce, and one that is non-corrosive on metals.

To accomplish the above and other important objects, as will more fully herein appear, my invention in general comprises the use of a substance as a refrigerant that has a low boiling point and that can be condensed with ease.

I have found that trimethylene, having the formula $CH_2 < (CH_2)_2 >$, makes a particularly efficient refrigerant. This substance boils at $-34.4°$ C. under ordinary atmospheric pressure, and has a high latent heat of vaporization. Its high latent heat, together with its low specific heat, causes a large refrigerating effect per cycle of evaporation. This is of particular importance in an adsorption refrigerating process, and renders it adaptable for various types of refrigeration, whether merely to cool water or where it is desired to obtain the lower temperatures as in the freezing of ice cream.

While my invention is particularly adapted for use in an adsorption process, it is to be clearly understood that it is not limited thereto, but may be also employed in a compression process.

Trimethylene is a stable substance and does not break down under ordinary working conditions, making it eminently fit in an adsorption process. It is stable up to red heat, and inasmuch as an adsorption apparatus is rarely subjected to temperatures in excess of 300° F., while the heats involved in compression apparatus are somewhat lower, there is no danger of decomposition of my refrigerant.

Liquefaction of trimethylene may be effected at from 70 to 85 pounds of pressure at ordinary atmospheric temperatures. This is of particular importance, for with such a low pressure of liquefaction it is possible to use an apparatus composed of normal pipe and tubing. Many of the refrigerants heretofore used have required such high pressures to obtain liquefaction that it has been necessary to unduly strengthen the apparatus, at considerable expense and difficulty of handling.

Trimethylene does not unite with, or tend to break down lubricating oil, although it does tend to dilute an impure mineral oil. Castor oil and pure mineral oils are impervious to trimethylene and may be readily substituted in a compression apparatus for the ordinary lubricating oils employed.

My refrigerant has a non-corrosive action on metals, and may therefore be used with an apparatus composed of iron, steel, copper, bronze, aluminum, or any other metal, or compounds, or alloys.

Trimethylene is extremely soluble in alcohol or ether and these substances may be used as absorbents. In the case of an adsorption apparatus, glaucosil, silica in skeleton form, silica gel, carbon, activated carbon, or any of the other conventional adsorbents may be employed. All of the substances are comparatively cheap and easy to obtain.

Trimethylene has a rather unpleasant odor, and is therefore quite easily detected should a leak occur in the apparatus. It is non-injurious to health, and the danger heretofore present with many of the ordinary refrigerants is thus removed.

Trimethylene has no affinity for water or air, and any air, even with an aqueous content, that may be sucked into the apparatus, or left in the system before charging with the refrigerant, has no deleterious effect on the refrigerant or system. This constitutes a considerable advantage over some of the refrigerants heretofore used, such as methyl or ethyl chloride, for there is no danger of frozen moisture clogging the control valves. Any water that may be found in the system will gravitate to the bottom of the receiving tank, and may there be easily removed.

The apparatus for use with my refrigerant may be of an extremely simple type and may take the conventional form. For an adsorption machine, there may be the adsorber-generator in which the adsorbent is held, and to which heat is applied to drive off, in the form of a gas, the adsorbed refrigerant. Because trimethylene condenses at a relatively low pressure and high temperature, the condenser may be merely air cooled. This convenient method is very advantageous in that complicated water cooled condensing apparatus may be eliminated. A storage tank may be provided to hold the liquid until the heating cycle has terminated and the cooling cycle commenced.

An adsorbent is placed in the adsorber-generator, and the volatilized refrigerant is introduced thereto where it is adsorbed by the adsorbent. Heat is then applied to the adsorber-generator, and the refrigerant is driven off from the adsorbent in the form of a gas. It passes through appropriate channels to the condenser, and, by reason of the pressure created by applying heat to the adsorber-generator and by reason of the cooling effected by the condenser, the gaseous refrigerant is liquefied. From the condenser the liquefied refrigerant passes to the storage tank, or receiver, and there remains until the cooling cycle commences.

When heat is withdrawn from the adsorber-generator there is a consequent decrease in pressure within the generator and an increased adsorptive capacity of the adsorbent. When the heat is removed from the adsorber-generator the liquefied refrigerant passes to the evaporator and is there volatilized, or the receiver may act as part of the evaporator system. This evaporation of the refrigerant produces the refrigerating effect. After evaporation the gaseous refrigerant passes to the adsorber-generator and is there adsorbed by the adsorbent. This cycle is repeated as frequently as the circumstances of operation demand. The foregoing cycle and method also applies to absorption apparatus.

A compression apparatus may be of the conventional type, including a compressor, a condenser, a receiver, an expansion valve and evaporator, and the usual steps of a compressing process followed. I wish it to be distinctly understood that my invention is to be limited in no wise by the apparatus herein described.

It will be observed from the foregoing that I have provided a highly efficient refrigerant that is stable under working conditions, that is susceptible of long and continued operation, that is non-corrosive on metals, and that has no affinity for water or air. Where I have used the word "adsorption", it is to be understood that this term embraces both adsorption and absorption, for an advantage of my invention is that it may be used in either of these types of apparatus, or in a compression machine. Cyclopropane and cyclotrimethylene are other names by which trimethylene is known.

It is to be understood that my invention is to be limited merely by the appended claims and the showing of the prior art.

I claim as my invention:

1. A refrigerating process comprising liquefying and evaporating a carbocyclic compound of three carbon atoms.

2. A process of refrigeration comprising liquefying and evaporating a cycloparaffin.

3. A process of refrigeration comprising liquefying and evaporating trimethylene.

4. A refrigerating process comprising adsorbing a volatilized carbocyclic compound of three carbon atoms by a suitable agent, heating the adsorbent to drive off the compound in gaseous form, condensing the gas of the compound, and reducing the pressure of the liquefied compound to cause evaporation.

5. A refrigerating process in which trimethylene is used as the refrigerant, comprising adsorbing volatilized trimethylene by a suitable agent, heating the adsorbent to drive off the refrigerant, condensing the refrigerant gas, and reducing the pressure of the condensed refrigerant to cause evaporation.

6. A process of refrigeration comprising taking up volatilized trimethylene in a suitable agent, heating the agent to drive off the trimethylene and collecting the evolved trimethylene and effecting evaporation to produce refrigeration.

7. A process of refrigeration comprising adsorbing and desorbing a cyclo-paraffin.

8. A refrigerating process comprising adsorbing a volatilized cyclo-paraffin by a suitable agent, heating the agent to drive off the cyclo-paraffin, condensing the evolved cyclo-paraffin, and reducing the pressure on the condensed cyclo-paraffin to cause evaporation.

9. A process of refrigeration comprising taking up volatilized trimethylene in a suitable agent, heating the agent to drive off the trimethylene, condensing the evolved gas and reducing the pressure of the condensed material to effect evaporation.

10. A process of refrigeration comprising liquefying and cooling trimethylene and passing the cooled liquefied trimethylene to a zone of reduced pressure to cause evaporation thereof.

11. A process of refrigeration comprising liquefying and cooling cycloparaffin and passing the cooled liquefied cycloparaffin to a zone of reduced pressure to cause evaporation thereof.

In testimony whereof I affix my signature.

LEONARD KAY WRIGHT.